June 4, 1940.  H. A. FARNSWORTH  2,203,564
WATER GATE FOR PNEUMATIC TIRES
Filed Aug. 29, 1939
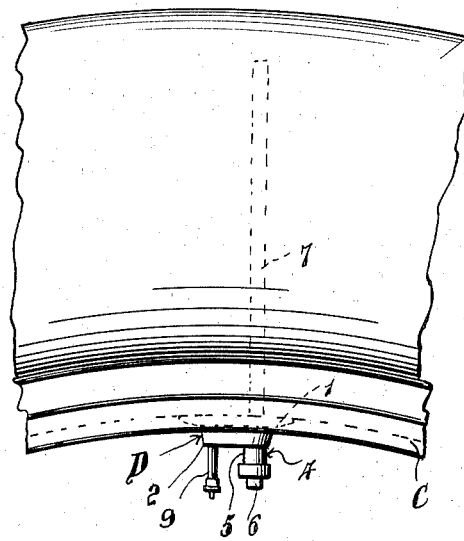
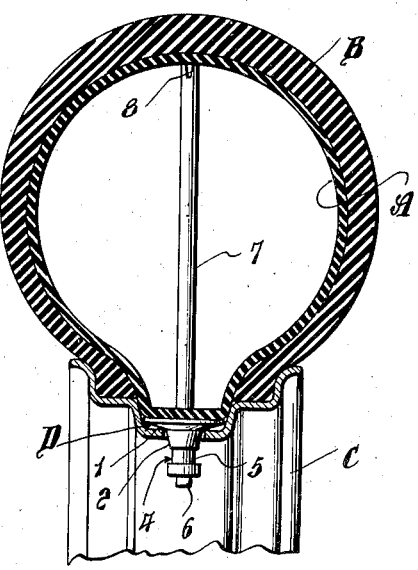
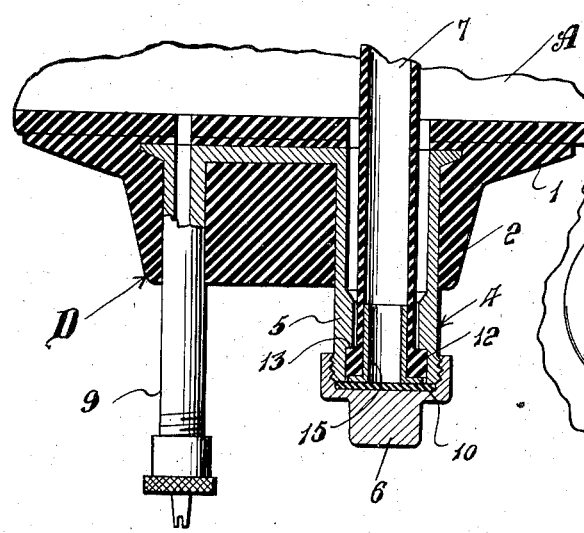
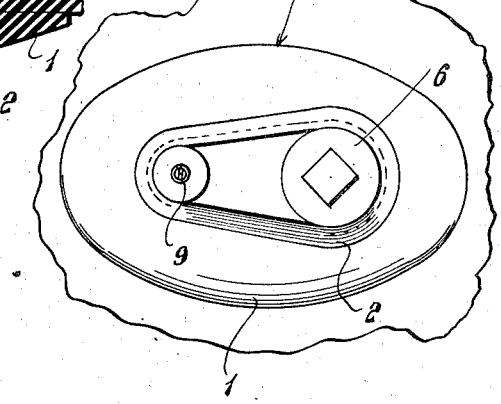
Inventor
Harry A. Farnsworth
By
Attorney Patented June 4, 1940

2,203,564

UNITED STATES PATENT OFFICE 2,203,564

WATER GATE FOR PNEUMATIC TIRES

Harry A. Farnsworth, Elkhart, Kans.

Application August 29, 1939, Serial No. 292,530

1 Claim. (Cl. 152—330)

This invention relates to new and useful improvements in water gates for pneumatic tires, and is especially designed for filling the inner tubes of pneumatic tires used on tractors, with water, when it is desired to increase the weight and traction of the machine.

The primary object of my invention is to provide a novel water gate of the character specified, whereby the time and labor ordinarily required in filling and emptying the inner tubes of the tires is greatly reduced.

A further object of my invention is to provide a water gate for tractors that is simple and economical in construction and highly efficient and durable in use.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a fragmentary side elevation of a pneumatic tire and rim, illustrating the application of my invention.

Figure 2 is a vertical transverse section.

Figure 3 is an enlarged detail bottom plan view of the water gate, and Figure 4 is an enlarged detail vertical longitudinal section of the water gate and associated parts.

Referring to the drawing for a more particular description of my invention, and in which drawing like parts are designated by like reference characters throughout the several views, A indicates the inner tube, B the outer casing, C the rim of the tractor wheel and D my improved water gate, as a whole.

Specifically, the water gate comprises the oblong substantially elliptical base 1, formed with a hollow outwardly projecting sleeve 2 of elongated oval-like form which completely encompasses the inner end of the water gate, consisting of the base 3, water pipe 4 and air valve 9, and is vulcanized thereto. The outer end 5 of the water pipe 4 is straight and closed by the screw threaded cap 6 and the rubber gasket 10. A rubber tube 7 extends into and entirely across the inner tube A of the tire, and the inner end of this tube is notched, as at 8, to facilitate the flow of water into and out of the inner tube, under all conditions. The water pipe 4 and the straight air valve 9 are cast integral with the base 3 and project a suitable distance through the rim C of the tractor wheel.

The outer end of the rubber tube 7 is formed with an annular collar or flange 12, which fits in a corresponding groove or recess 13 formed in the outer end and inner wall or surface of the water pipe 4, and is held firmly in place by the flanged metal sleeve 15, which fits tightly in the outer end of the rubber tube 7.

In practice, to fill the inner tube of the tractor tire with water, to increase the weight and traction of the machine, the wheel is first turned to bring the water gate to the exact top and the air valve core is removed, thus converting the valve stem into an air vent, to facilitate the inflow of water. A water hose is then attached to the water pipe and water allowed to run into the inner tube until it begins to overflow through the air vent. The cap 6 of the water pipe 4 is then screwed down tight on the gasket 10 to form a perfect seal and the air pump is then allowed to function until the desired pressure is obtained. The pressure test is made as on any pneumatic tire. To inflate the tire with air, the air valve core is replaced in the valve stem, as will be apparent.

To empty the inner tube of water, the wheel is turned to place the water gate directly at the bottom and it is then only necessary to remove the cap 6 of the water pipe, since the air pressure in the tire will cause the rapid expulsion of the water. Should the water not be completely discharged from the inner tube by the stored air pressure, an air pump may be connected to the air valve 9 and air pumped into the tire until it begins to bubble out of the mouth of the water pipe, thus indicating that the tire is empty. The cap 6 of the water pipe is then screwed down tight on the gasket 10 to form a perfect seal and the pump is allowed to function until the desired pressure is obtained. The pressure test is made as on any pneumatic tire.

It has been found from actual practice, that with the use of my device, the work can be performed by one person in about thirty minutes (per wheel) whereas the usual method requires two men and six or seven hours per wheel; thus saving considerable time and labor.

Various changes in the form, proportions and minor details of construction may be resorted to without departing from the principles or sacrificing any of the advantages of my invention, as defined in the appended claim.

Having described my invention, what I claim as new and desire to secure by Letters Patent, is:

In a water gate for pneumatic tires for tractors, a straight metal water pipe extending through the rim of the wheel, a cap screwing on the outer end of the water pipe, an elongated base encompassing the inner end of the water gate and firmly vulcanized thereto, a rubber tube inserted through the outer end of the water pipe and extending into and completely across the inner tube of the tire, a flanged sleeve to hold said rubber tube securely in place and an air valve cast integral with the water pipe, both having a common base.

HARRY A. FARNSWORTH.